(12) United States Patent
Devonec

(10) Patent No.: US 12,514,588 B2
(45) Date of Patent: Jan. 6, 2026

(54) DEVICE FOR EXERTING A PULLING ON THE TUBING OF A CATHETER FOR HAEMOSTASIS OF THE PROSTATIC CAVITY AFTER SURGERY FOR BENIGN PROSTATIC HYPERPLASIA

(71) Applicant: Marian Devonec, Miribel (FR)

(72) Inventor: Marian Devonec, Miribel (FR)

( * ) Notice: Subject to any disclaimer, the term of this patent is extended or adjusted under 35 U.S.C. 154(b) by 819 days.

(21) Appl. No.: 17/797,613

(22) PCT Filed: Feb. 10, 2021

(86) PCT No.: PCT/FR2021/050241
§ 371 (c)(1),
(2) Date: Aug. 4, 2022

(87) PCT Pub. No.: WO2021/160966
PCT Pub. Date: Aug. 19, 2021

(65) Prior Publication Data
US 2023/0017763 A1    Jan. 19, 2023

(30) Foreign Application Priority Data
Feb. 11, 2020 (FR) ..................... 20/01338

(51) Int. Cl.
*A61B 17/12*     (2006.01)
*A61B 17/00*     (2006.01)

(52) U.S. Cl.
CPC ............. *A61B 17/12136* (2013.01); *A61B 2017/00274* (2013.01); *A61B 2017/12004* (2013.01)

(58) Field of Classification Search
CPC .... A61B 17/12136; A61B 2017/00274; A61B 2017/12004; A61B 2090/065;
(Continued)

(56) References Cited

U.S. PATENT DOCUMENTS 10,315,023 B2 * 6/2019 Mantri ................. A61M 39/06
11,278,293 B2 * 3/2022 Mantri ............ A61M 25/10184
(Continued)

FOREIGN PATENT DOCUMENTS

WO    2017161331 A1    9/2017
WO    2017174950 A1    10/2017

OTHER PUBLICATIONS

International Search Report issued Jul. 19, 2021 re: Application No. PCT/FR2021/050241, pp. 1-3, citing: WO 2017161331 A1 and WO 2017174950 A1.

*Primary Examiner* — Bo Joseph Peng
(74) *Attorney, Agent, or Firm* — CANTOR COLBURN LLP

(57) ABSTRACT

A haemostatic device for treating post-operative bleeding of the prostatic cavity, having a body or catheter having a first canal in fluidic communication with a first inflatable balloon formed on the body. The balloon and canal are positionable inside the bladder against the back of the bladder and configured to apply a determined pressure, in the inflated state, on the prostatic cavity to block off and isolate the prostatic cavity, to reduce its volume and to occlude the blood vessels in its cavity wall. The body includes a second canal fluidically connected to a second balloon, to extend in the prostatic cavity while conforming to the irregularities of the prostatic cavity. The device has a tensioning tube for easy insertion of the penis in the flaccid state, without compressing the walls of the penis or the glans, having a longitudinal slot extending between two ends of the tensioning tube.

21 Claims, 11 Drawing Sheets

(58) Field of Classification Search
CPC ................ A61M 25/013; A61M 25/04; A61M 2025/1052; A61M 25/1011
See application file for complete search history.

(56) References Cited

U.S. PATENT DOCUMENTS

| | | | |
|---|---|---|---|
| 11,553,924 B2 * | 1/2023 | Mantri | ............. A61B 17/00234 |
| 11,871,933 B2 * | 1/2024 | Mantri | ............. A61B 17/12186 |

* cited by examiner

[Fig. 1]
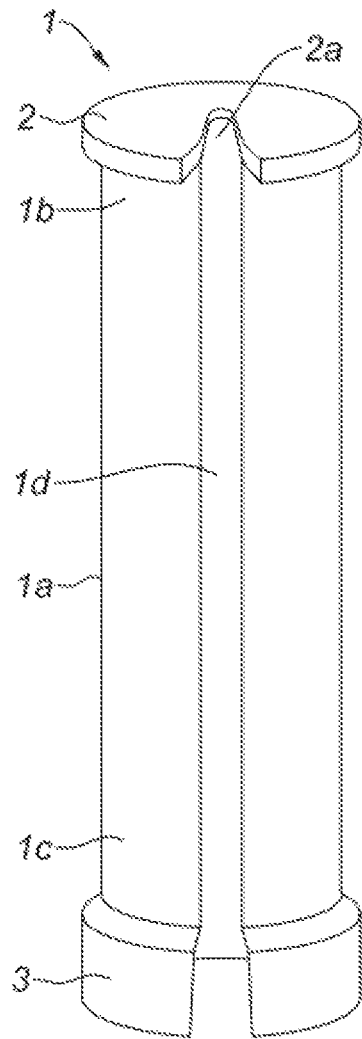
[Fig. 2]
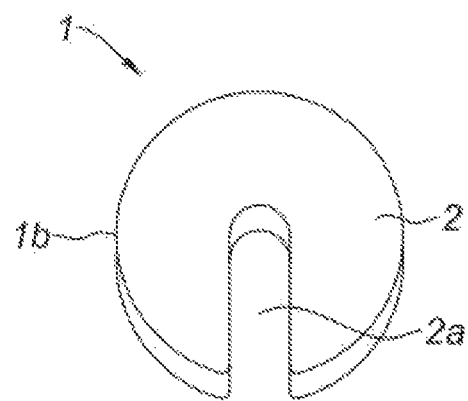

[Fig. 3]
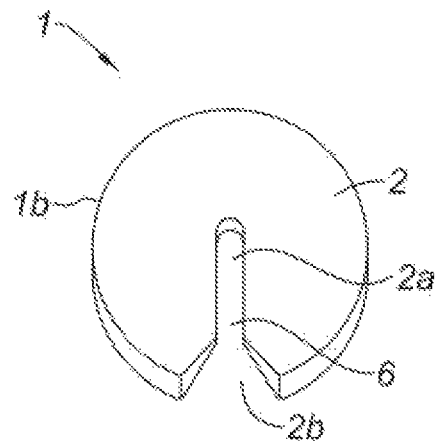
[Fig. 4]
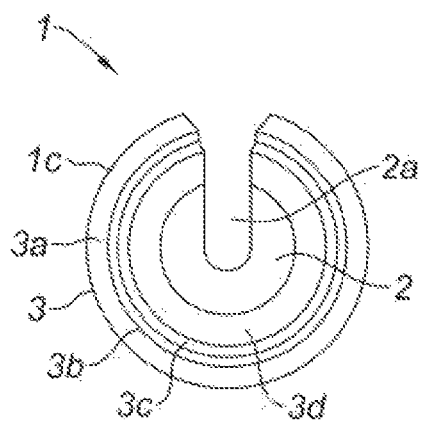
[Fig. 5]
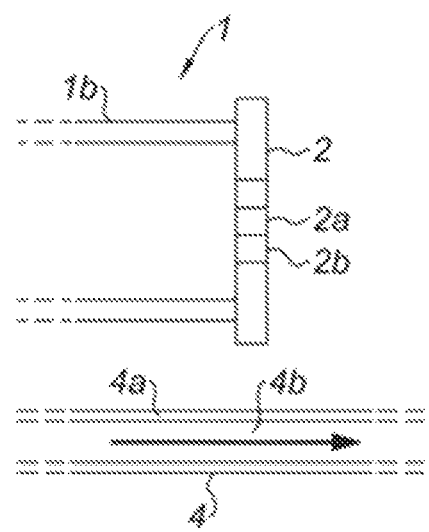

[Fig. 6]
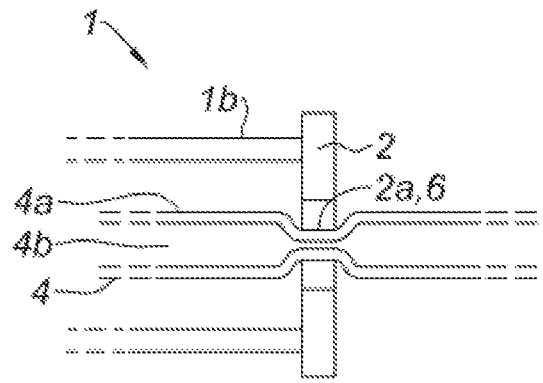
[Fig. 7]
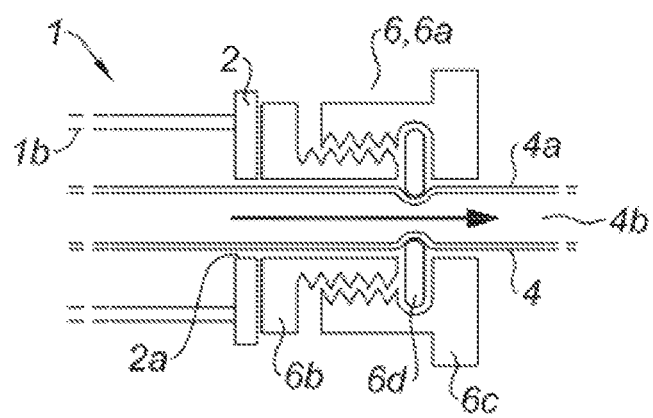
[Fig. 8]
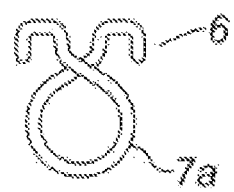
[Fig. 9]
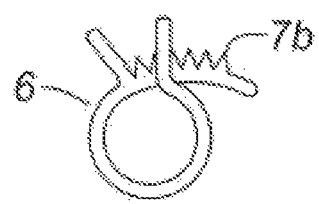

[Fig. 10]
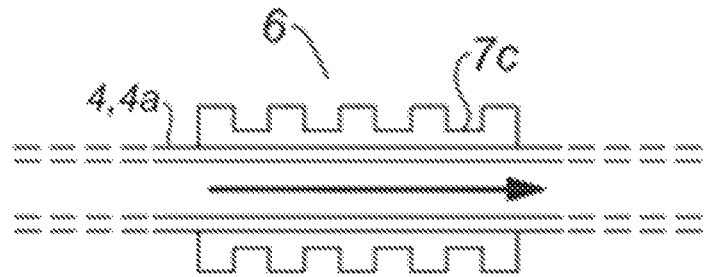
[Fig. 11]
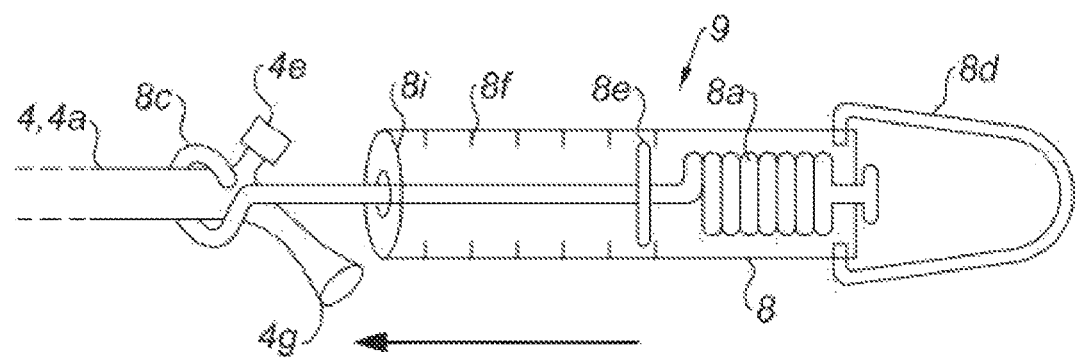
[Fig. 12]
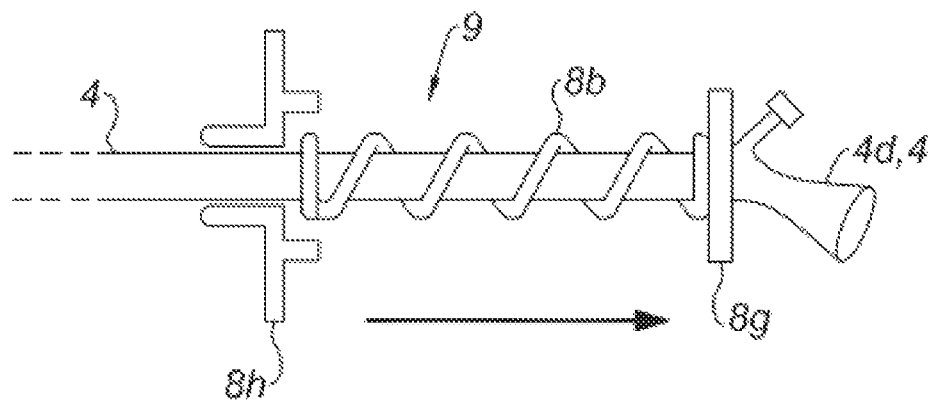

[Fig. 13]
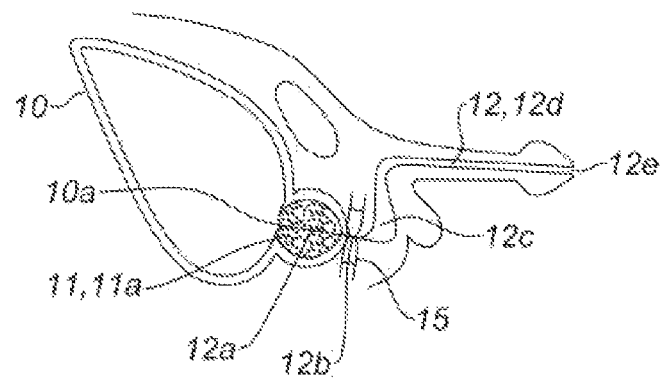
[Fig. 14]
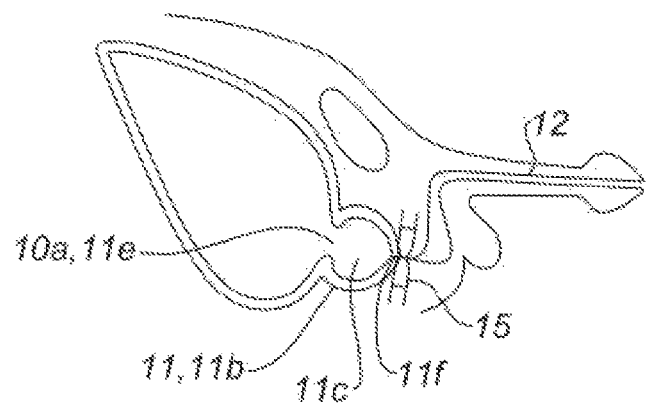
[Fig. 15]
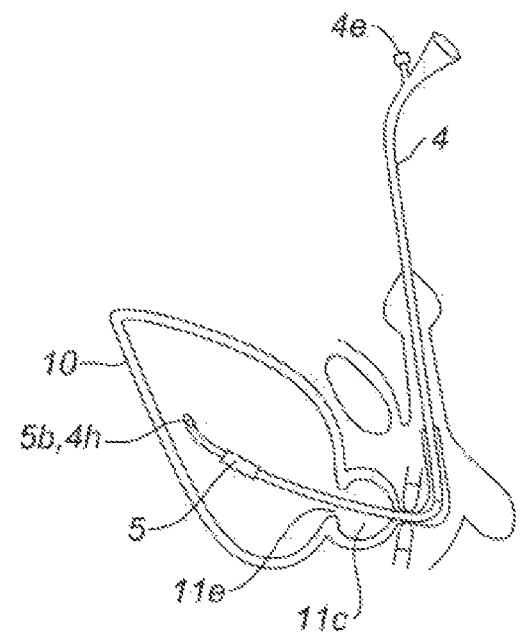

[Fig. 16]
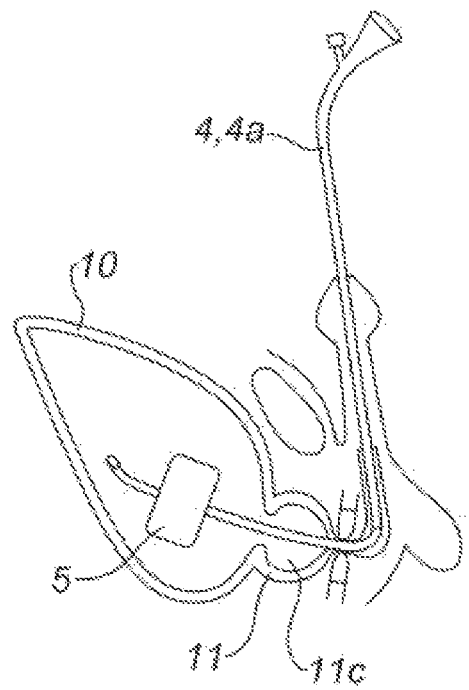
[Fig. 17]
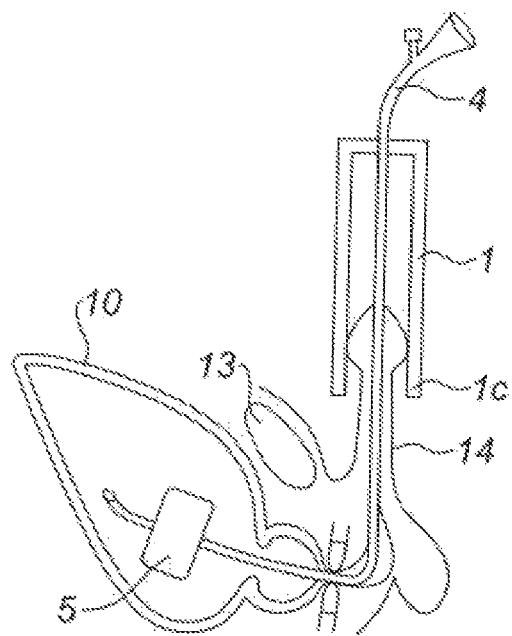

[Fig. 18]
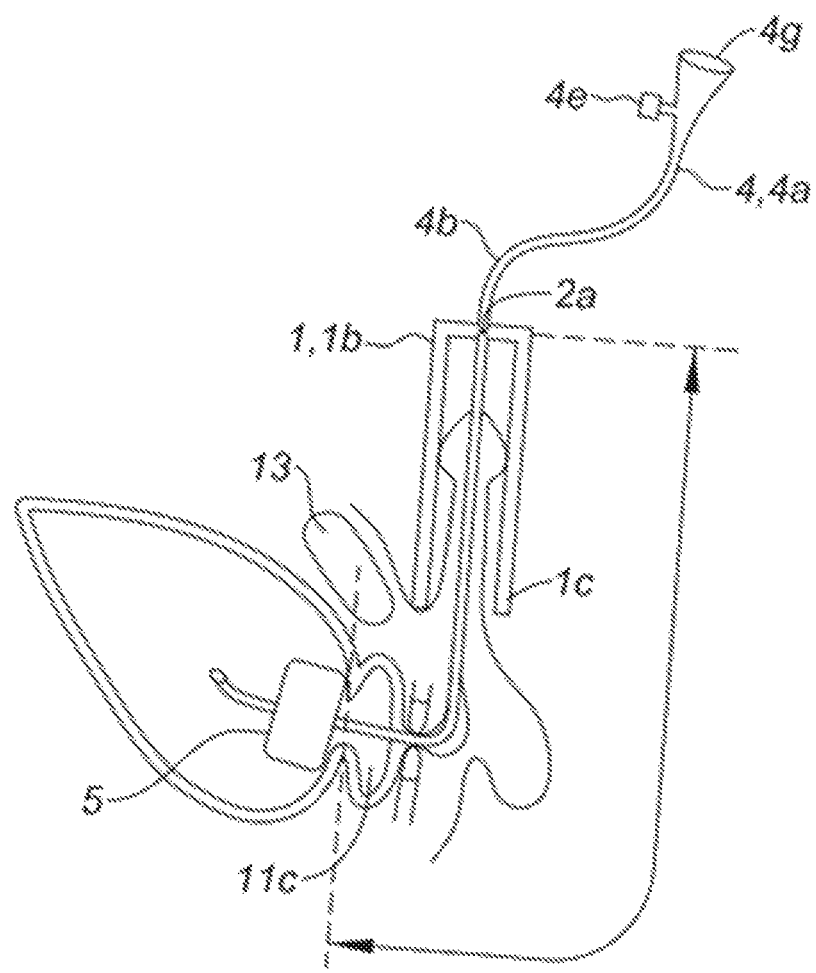

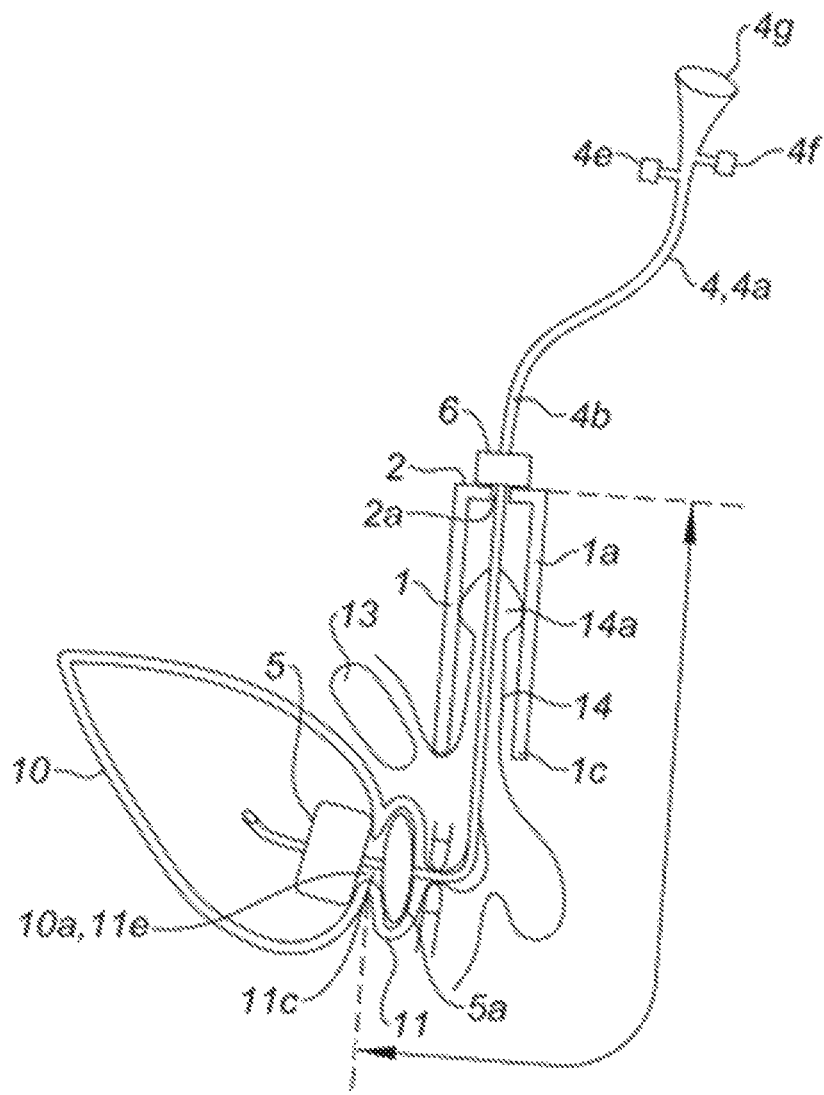
[Fig. 19]

[Fig. 20]
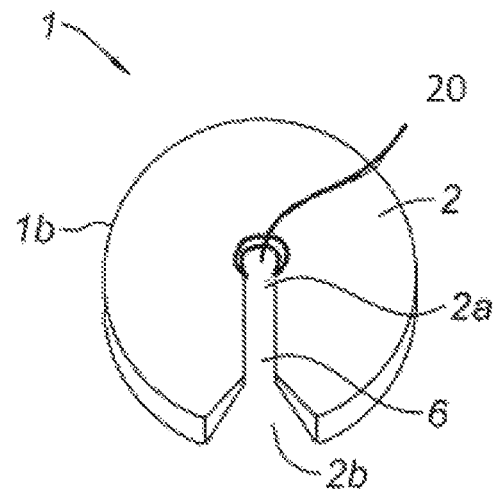
[Fig. 21]
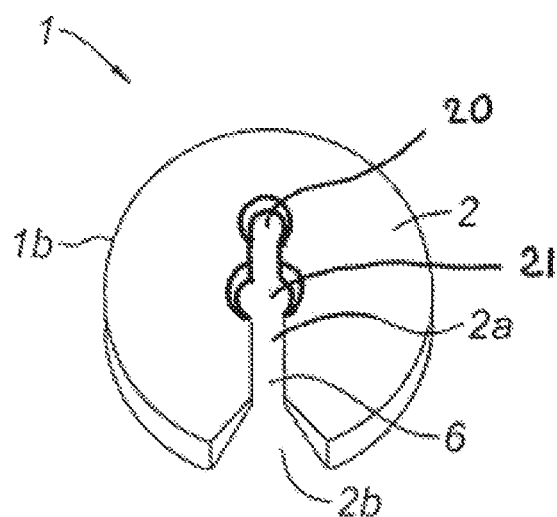

[Fig. 22]
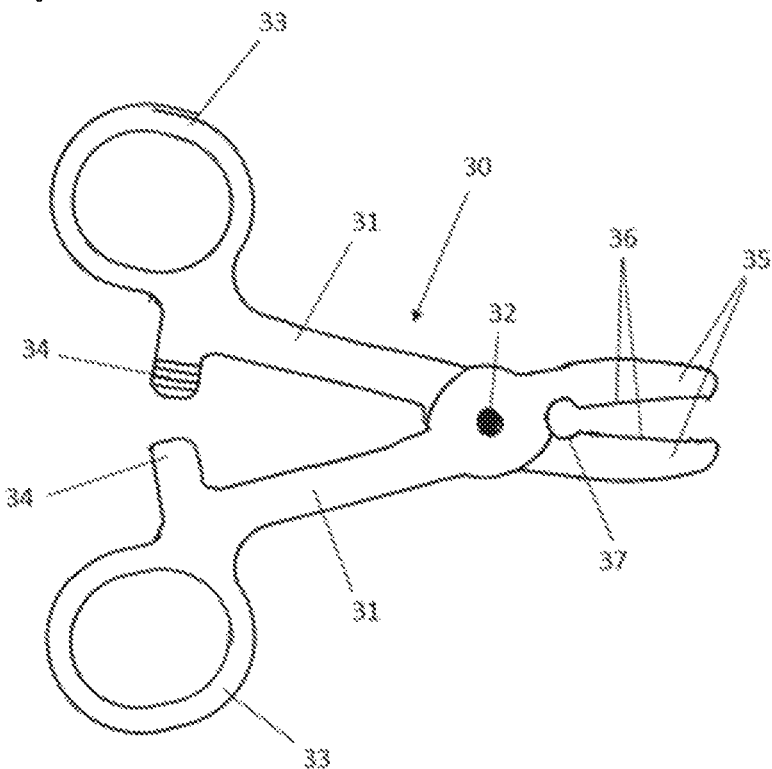
[Fig. 23]
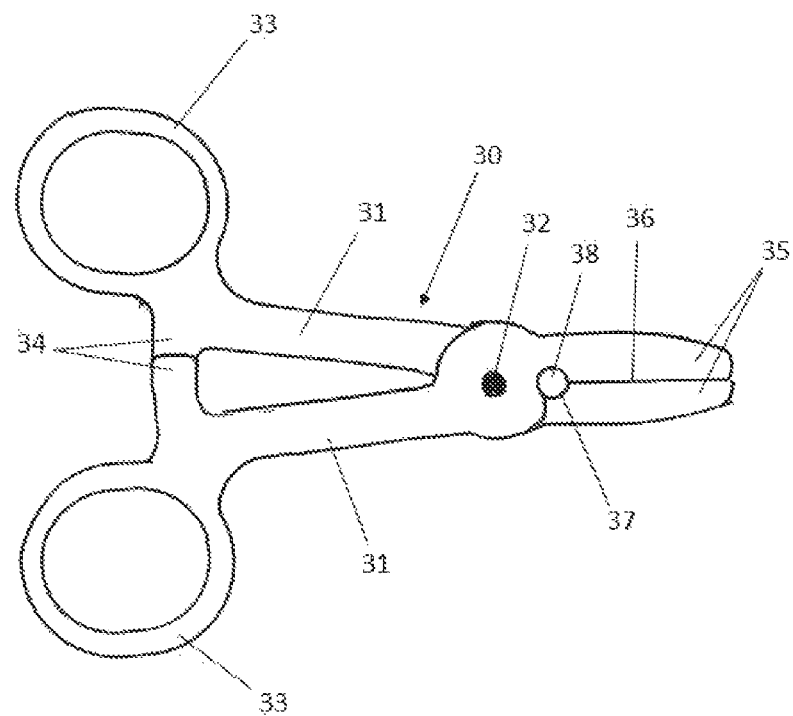

[Fig. 24]
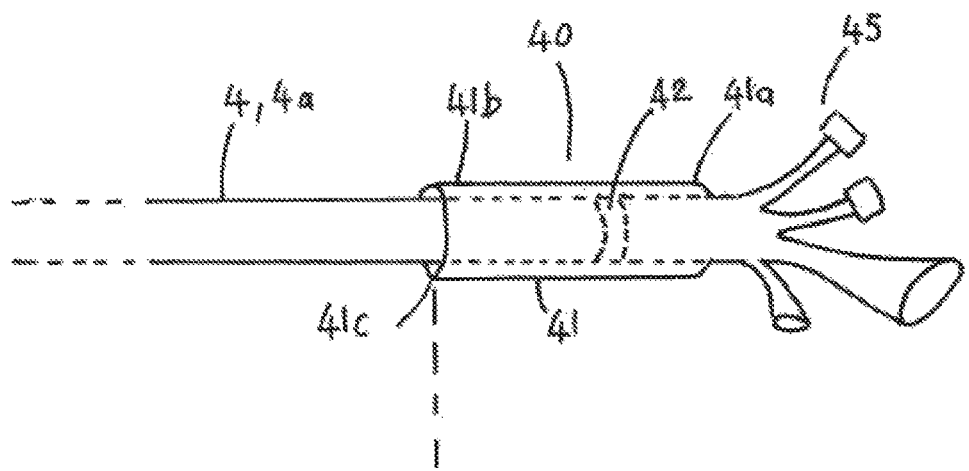
[Fig. 25]
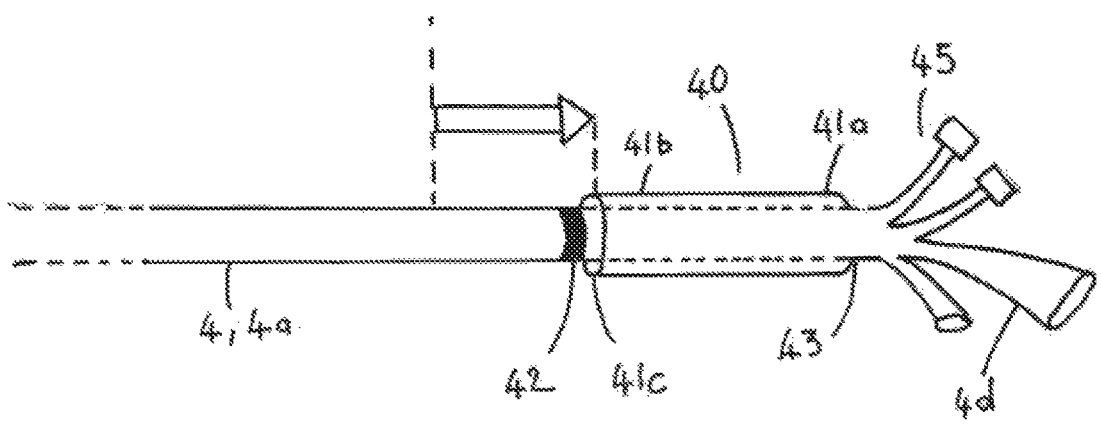

DEVICE FOR EXERTING A PULLING ON THE TUBING OF A CATHETER FOR HAEMOSTASIS OF THE PROSTATIC CAVITY AFTER SURGERY FOR BENIGN PROSTATIC HYPERPLASIA

TECHNICAL FIELD

The present disclosure concerns the field of urological surgery and more particularly a device for exerting pulling on the tubing of a catheter for haemostasis of the prostatic cavity after surgery for benign prostatic hyperplasia.

BACKGROUND

It is well known that the operation of prostate adenoma or benign prostatic hypertrophy (BPH) is one of the operations most frequently performed by the urological surgeon. This operation is performed either openly with an incision in the abdominal wall in the suprapubic region, or most often by natural transurethral or endoscopic route. Among the difficulties of this operation, the haemostasis or control of per and post-operative bleeding remains a problem.

The haemostasis is incomplete at the end of the operation. This is the reason why, at the end of the operation, the operator places a catheter in the bladder with a balloon which rests on the orifice of the bladder and allows it to be maintained inside the bladder. The role of this catheter is to allow the systematic irrigation of the interior of the bladder with saline and the drainage outside the bladder of the mixture between urine and irrigation fluid. This urine-irrigation fluid mixture dilutes the bleeding and prevents the formation of blood clots which could block the drainage holes at the end of the catheter. The blocking of drainage orifices leads to acute retention of urine. Acute retention is hyperalgesic and requires emergency treatment.

Document WO2017/161331 is known, which describes a haemostatic device for the treatment of postoperative bleeding from the prostate cavity configured with at least one body or catheter comprising a first channel, a first inflatable balloon arranged on said body, the first balloon being in fluidic connection with the first channel, being intended to be placed in the bladder against the neck of the bladder and being configured to exert a determined pressure in the inflated state on the prostatic cavity so as to seal and isolate the prostatic cavity, to reduce the volume of the prostatic cavity and to occlude the vessels of the wall of the prostatic cavity, said body optionally comprising a second channel and a second balloon (808), said second channel being fluidly connected to the second balloon, the second balloon being configured to, in the inflated state, extending into the prostatic cavity conforming to the irregularities of said prostatic cavity. The device further comprises a flexible envelope whose dimensions allow easy introduction, in humans, of the penis in the flaccid state without risk of compression of the walls of the penis or of the glans, a means for blocking the position of said catheter in tension and a pulling means. The flexible envelope and the tensioning of the catheter allow the alignment of the urethra with the urethral sphincter, the tension on the catheter being maintained within a range comprised between 0.1 and 1.4 kg, i.e. a tension comprised between 1 and 14 Newton, which does not allow obturation of the prostatic cavity, isolation of the cavity and mechanical occlusion of the vessels. Moreover, the first balloon does not provide obturation and insulation of the prostate cavity, nor a reduction in the volume of the prostate cavity, nor an occlusion of the vessels of the wall of the prostate cavity. Indeed, the proximal and distal openings are not occluded and there is a reserved passage for the haemostatic agent in the direction of the bladder. In addition, the second balloon does not conform to the irregularities of the prostatic cavity, said balloon having a predetermined shape which does not allow conformation to the irregularities of the prostatic cavity.

Despite technical advances in instrumentation, bleeding after surgical treatment of benign prostatic hyperplasia remains an unresolved problem. Indeed, despite the use for ten years of new techniques for the endoscopic treatment of prostate adenoma by lasers and more recently by high-pressure water jet, the length of stay of patients remains 3.5 to 4.5 days in France (PMSI data, ATIH 2018). This duration is much longer than the ideal objective, which is to treat the patient on an outpatient basis. It is unpredictable and depends on the spontaneous cessation of postoperative bleeding treated only by bladder irrigation. The bladder irrigation is therapeutic nonsense since it keeps bleeding going by constantly diluting and eliminating the natural coagulation factors. After the operation, the blood loss over several days can be more than a litre; the blood haemoglobin level can drop by several grams per litre.

SUMMARY

One of the aims of the disclosure is therefore to remedy these drawbacks by proposing a tensioning tube of a catheter for haemostasis of the prostatic cavity after surgery for benign prostatic hypertrophy making it possible to obtain immediate haemostasis from the end of the operation and, ultimately, allowing the patient to leave the same day or at the latest the day after the operation, whatever the used technique.

To this end, and in accordance with the disclosure, there is proposed a haemostatic device for the treatment of postoperative bleeding from the prostate cavity, configured with at least one body or catheter comprising a first channel, a first inflatable balloon formed on said body, the first balloon being in fluid connection with the first channel, being intended to be placed in the bladder against the neck of the bladder and being configured to exert a determined pressure in the inflated state on the prostatic cavity so as to seal and isolate the cavity prostatic cavity, to reduce the volume of the prostatic cavity and to occlude the vessels of the wall of the prostatic cavity, said body optionally comprising a second channel and a second balloon, said second channel being fluidly connected to the second balloon, the second balloon being configured, in the inflated state, to extend into the prostatic cavity by conforming the irregularities of said prostatic cavity; said device is remarkable in that it comprises at least one so-called tensioning tube, the height and diameter of which allow the easy introduction, in humans, of the penis in the flaccid state without risk of compression of the walls of the penis nor of the glans, comprising a longitudinal slit which extends from one end to the other of the tensioning tube, i.e. from the proximal end capable of bearing on the pubis to the distal end, and the width of which allows the passage inside the tensioning tube of a catheter, a blocking means for blocking the position of said catheter under tension and a pulling means for pulling the catheter to tension said catheter.

It is well understood that the catheter put in place at the end of the operation to drain the urine and possibly the irrigation fluid will be used to achieve haemostasis. The catheter has at least one bladder balloon at its distal end. This balloon, positioned inside the bladder, seals off the orifice of the cavity hollowed out inside the prostate and compresses this cavity. The compression by the balloon mechanically occludes the bleeding vessels at the opening of the cavity and the wall of the cavity. The compression by the balloon also makes it possible to reduce the volume of the cavity. This balloon has standardized characteristics: after filling, its shape is cylindrical, its filling volume is invariable, with a high standard pressure. These characteristics guarantee the absence of deformation of the balloon under the effect of a pulling force exerted at the part of the catheter situated outside the patient. As a result, the balloon remains inside the bladder despite the pulling force exerted on the portion of the catheter tubing located outside the patient.

Moreover, the distal end of the tensioning tube is partially closed by a cover having a radial slot which extends from the centre of the cover to the outside at the periphery of the cover, opening into the longitudinal slot of the tensioning tube, the radial slot of the cover and the longitudinal slot of the tensioning tube being in the same axial and longitudinal plane.

Said cover is glued or screwed to the tensioning tube or without solution of continuity with the tube, that is to say molded with the tensioning tube.

According to a variant, the radial slot is called wide and has a width greater than or equal to the outer diameter of the catheter, thus allowing the passage without compression of a urethral catheter inside which the flow of urine is maintained.

According to another variant, the radial slot is called narrow and has a width less than the outer diameter of the catheter, thus forming a blocking means for blocking the catheter by the tensioning tube. The flow of urine inside the catheter is then reduced or even interrupted.

Advantageously, the opening of said narrow radial slot has a V-shape ensuring the guidance of the catheter during the introduction of the catheter into said radial slot.

According to another alternative variant, the so-called narrow radial slot has a circular widening at the centre of the cover, the diameter of the circular widening at the centre of the cover being smaller than the outer diameter of the catheter. Thus, despite the blockage of the catheter at the widening in the centre of the cover, the lumen of the catheter remains permeable, and the flow of urine is maintained inside the catheter.

Incidentally, the so-called narrow radial slot may have several circular widenings of increasing or decreasing diameters close to the centre of the cover. Thus, catheters of different diameters can be blocked while maintaining the flow of urine therein.

Preferably, the proximal end of the tensioning tube is covered over a height of a few centimetres by a foam sheath secured to the outer wall of the tensioning tube, without covering the longitudinal slot.

According to a variant, said blocking means consists of a coaxial stuffing box cylinder.

Said coaxial stuffing box cylinder comprises two parts, a male part and a female part, assembled according to the principle of a bolt, which trap an O-ring compressed by the screwing and tightening of the female part on the male part, the lower male part having a flat base bearing on the outer side of the cover and the screwing of the upper female part on the lower male part crushing the O-ring which expands in the direction of the catheter and compresses the wall of the catheter in a circular manner.

According to another variant, said blocking means consists of a circular spring clamping clip bearing on the cover of the tensioning tube.

According to another variant, said blocking means consists of a clamping clip with notched tongue bearing on the cover of the tensioning tube.

According to another variant, said blocking means consists of a clamp consisting of two arms articulated about an axis, each arm comprising at a first end a ring provided with a notched lug and at its opposite end a jaw, and a portion of the inner edge of each of the jaws comprises a semi-circular cutout. Thus, the clamp being in the closed position, a circular orifice is provided along the length of the contact line between the two jaws. This circular orifice is located near the joint between the two jaws. The diameter of this circular orifice allows the blocking of the catheter with maintenance of a lumen at the catheter and of a flow of urine inside the catheter. The clamp can be placed and tightened on the catheter after the catheter has been placed in a patient. On the other hand, the cylinder and the co-axial clips must be placed around the catheter before the placement of the catheter.

According to another variant, said blocking means consists of a co-axial sleeve with notched outer wall, said co-axial sleeve with notched outer wall being glued to the outer wall of the catheter or obtained in one piece with said catheter, and the blocking of the position of the catheter being ensured by engaging in the wide radial slot of the cover the notch of the co-axial sleeve with notched outer wall facing the wide radial slot.

In these latter variants, the flow of urine is maintained inside the catheter under tension and in a blocked situation.

Moreover, said pulling means for pulling the catheter consists of a dynamometer independent of the catheter and of the tensioning tube.

Said dynamometer comprises a hook positioned at the bifurcation of a tubing of the catheter to form the inflation tubing of the bladder balloon of the catheter and the connection cone with the tubing for collecting urine in the urine collection bag, a handle allowing the extension of a spring until reaching the desired standard tension according to a scale indicated by a slider.

According to another variant, said pulling means for pulling the catheter consists of a compression spring coaxially surrounding the proximal end of the urethral catheter, said spring extending between a movable ring and a fixed ring in contact with the bifurcation at the proximal end of the catheter.

According to another variant, said pulling means for pulling the catheter is manual, and the standard tension control means is a device attached to the proximal end of the catheter. The device associates, for example, a sleeve coaxial with the catheter and a circular mark secured to the body of the catheter.

It will be observed that pulling the catheter is a known means for controlling haemostasis after surgery for prostatic adenoma. Nonetheless, its effectiveness is not recognized by the urological community because its effect is not reproducible. The non-reproducibility of the pulling effect can be explained by two reasons:

the lack of standardization of the balloon: after filling, its shape is spherical, its filling volume is variable, left to the discretion of the operator, and it deforms under the effect of pulling. Deformed, it comes out of the bladder and descends into the prostatic cavity. The balloon then compresses only the lower opening of the cavity. The cavity remains open at its upper orifice which communicates widely with the bladder. Bleeding from the prostatic cavity evacuates into the bladder, where clots can form and block the catheter drainage orifice.

the lack of standardization of pulling: the pulling technique is left to the appreciation of each operator who reproduces that which has been taught to him. The technique varies according to the mode of fixing the position of the catheter, according to the force of exerted tension, and according to the duration of application of the pulling force. The catheter is most often immobilized by a band of plaster stuck on the patient thigh, or on the lower part of the abdomen. Under the effect of hairiness and perspiration, the band of adhesive tape comes off and the pulling relaxes and then disappears. For others, the fixation is done with a cord attached to a belt passed around the abdomen of the patient, or with a cord passing over the pulley of a mast fixed to the bed of the patient. Weights are suspended from the cord at the foot of the bed. The pulling force and duration of force application are not standardized. The duration varies from 1 to 24 hours.

The present disclosure makes it possible to standardize the pulling exerted on the tubing of a urinary drainage catheter with at least one bladder distal balloon thanks to the combination of three means: a pulling means, a blocking means and a tensioning means. The standard pulling means exerts a standard force on the catheter tubing. The blocking means blocks the position of the catheter with a standard tension. The tensioning means integrates the blocking means or not. In the latter case, the independent blocking means rests on one of the two ends of the tensioning means. The opposite end of the tensioning means rests on the patient pubis.

The role of the catheter is not only the drainage of urine, but it also becomes, advantageously, the means of immediate haemostasis of the prostatic cavity after surgery for prostate adenoma.

BRIEF DESCRIPTION OF THE DRAWINGS

Other advantages and characteristics will emerge better from the following description of a single variant, given by way of non-limiting example, of the tensioning tube of a urethral catheter with at least one bladder balloon in accordance with the disclosure, with reference to the accompanying drawings in which:

FIG. 1 is a front and perspective view of the tensioning tube according to the disclosure, FIG. 2 is a perspective top view of the tensioning tube according to the disclosure with cover and wide radial slot, FIG. 3 is a perspective top view of an alternative embodiment of the tensioning tube with cover and narrow radial slot, FIG. 4 is a perspective bottom view of the tensioning tube according to the disclosure, FIG. 5 is a longitudinal section view of the distal end of the tensioning tube and of part of the tubing of the urethral catheter located outside the tensioning tube according to the disclosure, FIG. 6 is a longitudinal section view of the distal end of the tensioning tube and of part of the tubing of the urethral catheter located inside the tensioning tube and passing through a blocking means integrated into the cover of the tensioning tube according to the disclosure, FIG. 7 is a longitudinal section view of the distal end of the tensioning tube and of part of the tubing of the urethral catheter located inside the tube and passing through the cover of the tensioning tube then a blocking means bearing on the cover of the tensioning tube according to the disclosure, FIG. 8 is a front view of another variant of the means for blocking the tubing of the urethral catheter, said variant being in the form of an annular spring clamping clip, FIG. 9 is a front view of another variant of the means for blocking the tubing of the urethral catheter, said variant being in the form of a clamping clip with notched tab, FIG. 10 is a front view of another variant of means for blocking the tubing of the urethral catheter, said variant being in the form of a coaxial tube with a notched outer wall integrated into the tubing of the urethral catheter, FIG. 11 is a longitudinal and perspective schematic representation of the proximal end of the urethral catheter and of a means for tensioning the catheter by a dynamometer independent of the catheter, FIG. 12 is a longitudinal and perspective schematic representation of the proximal end of the urethral catheter and of another variant of tensioning the catheter by a compression spring integrated coaxially at the proximal end of the urethral catheter, FIG. 13 is a sagittal cross-sectional view of the anatomy of the male pelvis before surgery for a prostate adenoma, FIG. 14 is a sagittal cross-sectional view of the anatomy of the male pelvis after surgery for an adenoma of the prostate, more precisely after cutting out a cavity inside the prostate, FIG. 15 is a sagittal cross-sectional view after operation for an adenoma of the prostate followed by placement of the urethral catheter in the bladder, FIG. 16 is a sagittal cross-sectional view after operation for prostate adenoma followed by placement of the urethral catheter in the bladder and after inflation of the balloon of the urethral catheter inside the bladder, FIG. 17 is a sagittal cross-sectional view after surgery for prostate adenoma, followed by placement of the urethral catheter in the bladder and inflation of the balloon of the urethral catheter inside the bladder and after placement the tensioning tube around the penis and the urethral catheter, without tensioning the catheter, FIG. 18 is an identical sagittal cross-sectional view after tensioning the urethral catheter and blocking the position of the catheter under tension by the cover of the tensioning tube, FIG. 19 is a sagittal cross-sectional view after tensioning the urethral catheter and blocking the position of the catheter under tension by a coaxial blocking means bearing on the cover of the tensioning tube, then inflating a second prostatic balloon inside the prostatic cavity, FIG. 20 is a top perspective view of another variant of the tensioning tube with cover and narrow radial slot, FIG. 21 is a top perspective view of another variant of the tensioning tube with cover and narrow radial slot, FIG. 22 is a side view of another variant of the means for blocking the tubing of the urethral catheter, said variant being in the form of a clamp, in the open position, FIG. 23 is a side view of the variant of the means for blocking the tubing of the urethral catheter represented in FIG. 22, said variant being in the form of a clamp, in the closed position, FIG. 24 is a schematic representation of a standard tension control means in the form of a sleeve coaxial with the catheter and a circular mark secured to the body of the catheter, in the inactivated position, and FIG. 25 is a schematic representation of the standard tension control means represented in FIG. 24 and being in the form of a sleeve coaxial with the catheter and a circular mark fixed to the body of the catheter, in the activated position.

DETAILED DESCRIPTION OF THE DRAWINGS

In the remainder of the description of the tensioning tube of a urethral catheter with at least one bladder balloon according to the disclosure, the same numerical references designate the same elements. The various views are not necessarily drawn to scale.

With reference to FIG. 1, the device according to the disclosure comprises a so-called tensioning tube 1 consisting of a rigid hollow tube of rectilinear cylindrical shape. The height and the diameter of the tensioning tube 1 allow the easy introduction of the penis 14 in the flaccid state, not shown in FIG. 1, in humans, without risk of compression of the walls of the penis 14 or of the glans by the tensioning tube 1. This tensioning tube 1 has a longitudinal slot 1d which extends from one end to the other of said tensioning tube 1. This longitudinal slot 1d has a width which allows passage inside the tensioning tube 1d of a catheter 4 (FIGS. 15 to 19) of the 22 to 24 French unit, diameters usually used after surgery for adenoma 11a (FIG. 13) of the prostate. The tensioning tube 1 is preferably made of polyvinyl chloride PVC or any other biocompatible plastic or metal material and usually used in contact with the patient skin.

It is obvious that the tensioning tube 1 can be obtained in any suitable material well known to those skilled in the art without departing from the scope of the disclosure.

With reference to FIGS. 1 and 2, the distal end 1b of the tensioning tube 1 is partially closed by a cover 2, the distal end 1b corresponding to the distal end of said tensioning tube 1 shown vertically in FIG. 1. This cover 2 is glued or screwed to the tensioning tube 1 or without solution of continuity with the tube, that is to say molded with the tensioning tube 1. This cover 2 has a radial slot 2a, which extends from the centre of the cover 2 to the outside at the periphery of the cover 2, opening into the longitudinal slot 1d of the tensioning tube 1. Thus, seen from the front, the radial slot 2a of the cover 2 and the longitudinal slot 1d of the tensioning tube 1 are in the same axial and longitudinal plane. In this variant, the radial slot 2a is wide, i.e. has a width greater than or equal to the outer diameter of the catheter 4, and with parallel edges at the cover 2, thus allowing the passage without compression of a urethral catheter 4 of the 22 to 24 French unit. The cover 2 has a thickness of a few millimetres. It resists the tensioning pressure of the catheter 4 which is in the range of 40 Newtons. The composition of the cover 2 is of the same nature as that of the wall 1a of the tensioning tube 1. In this variant of the tensioning tube 1, the catheter 4 slides freely inside the wide slot 2a of the cover 2. Blocking the tensioned catheter 4 will come from a blocking means 6 independent of the tensioning tube 1 as will be detailed with reference to FIGS. 7 to 10, the blocking means 6 of the position of the catheter 4 under tension bearing both on the catheter 4 and on the cover 2 of the tensioning tube 1.

Moreover, the proximal end 1c, i.e. the lower end of the tensioning tube 1 shown vertically in FIG. 1, of the tensioning tube 1 is completely open. The circumference of the proximal end 1c of the tensioning tube 1 is interrupted by the longitudinal slot 1d described above. The proximal end 1c of the tensioning tube 1 is covered over a height of a few centimetres by a foam sheath 3 with a thickness of a few millimetres and attached to the outer wall of the tensioning tube 1, without covering the longitudinal slot 1d. The density and the thickness of the foam sheath 3 allow the patient to tolerate without pain the pressure exerted by the proximal end of the tensioning tube 1 on the pubis 13 during tensioning the catheter 4 as will be detailed a little further away. The foam sheath 3 is obtained from a biocompatible material well known to those skilled in the art, the contact of the foam sheath 3 with the patient skin being limited to a period in the range of one hour.

According to a variant of the device according to the disclosure, with reference to FIG. 3, the radial slot 2a is narrow, i.e. has a width less than the outer diameter of the catheter 4 or the French unit of the catheter 4, thus forming a blocking means 6 of the tensioning tube 1. Moreover, the opening of said radial slot 2a has a V-shape 2b ensuring the guidance of the catheter 4 during the introduction of the catheter 4 in said radial slot 2a. Thus, in this variant, the radial slot 2a is the blocking means 6 for blocking the catheter 4, the blocking means 6 being thus integrated into the tensioning tube 1. The tensioning tube 1 plays both the role of tensioning and blocking the position and the tension of the catheter 4. Once the catheter 4 has been tensioned with the desired force, the blocking of the catheter 4 takes place by lateral pressure exerted perpendicularly to the longitudinal axis of the catheter 4. The exerted pressure makes it possible to engage the catheter 4 in the V-shaped opening 2b at the periphery of the cover 2 as far as the bottom of the radial slot 2a, that is to say at the centre of the cover 2. At this level, the catheter 4 under tension is compressed and its position permanently blocked. A lumen 4b of the tubing of the catheter 4 is closed as will be detailed later with reference to FIGS. 5 and 6.

Moreover, with reference to FIG. 4, the tensioning tube 1 comprises, seen from the proximal end, five crowns which follow one another from outside to inside. The first ring, the outermost, is a view of the lower edge 3a of the foam sheath 3 which surrounds the base of the tensioning tube 1. The second ring is a perspective view of the inner slope of the wall 3b of the foam sheath 3. The third crown is a view of the lower edge 3c of the wall 1a of the tensioning tube 1. The fourth crown is a perspective view of the inner slope 3d of the wall 1a of the tensioning tube 1. The fifth and last crown is a view the lower slope of the cover 2 having a wide radial slot 2a with parallel edges.

With reference to FIGS. 5 and 6, the part of the tubing 4a of the catheter 4, located outside the tensioning tube 1 (FIG. 5), is not subjected to any tensioning force. The urine normally flows into the lumen 4b of the tubing 4a of the catheter 4 in the direction of the arrow. The cover 2 at the distal end 1b of the tensioning tube 1 has a narrow slot 2a with a V-shaped opening 2b to facilitate the introduction and blocking of the tubing 4a of the catheter 4 inside the narrow slot 2a. Next, with reference to FIG. 6, the tubing 4a of the catheter 4 is inside the tensioning tube 1. The catheter 4 has been tensioned and then blocked under tension in narrow slot 2a of the cover 2. The walls of the catheter 4 are then strongly deformed. The lumen 4b of the catheter 4 is closed. The flow of urine from the bladder 10 is thus stopped. The narrow radial slot 2a of the cover 2 is the blocking means 6 for blocking the catheter 4. This blocking means 6 is integrated into the cover 2 of the tensioning tube 1. The advantage of this blocking means is the ease of industrialization: it is in fact not necessary to manufacture an additional part dedicated to blocking. The disadvantage is, however, the interruption of the flow of urine from the bladder 10. It is therefore impossible to make the diagnosis of any bleeding inside the bladder 10. It is necessary then to unblock the catheter 4 at regular time intervals to watch the colour of the urine.

According to a variant of the blocking means 6 of the device according to the disclosure, with reference to FIG. 7, said blocking means 6 consists of a coaxial stuffing box cylinder 6a. In this variant, the cover 2 at the distal end 1b of the tensioning tube 1 has a wide radial slot 2a. The catheter 4 thus crosses the radial slot 2a freely. The catheter 4 is blocked under tension by a co-axial blocking means 6 of the tubing 4a of the catheter 4. This blocking means 6 is independent and is therefore not integrated into the tensioning tube 1. This blocking means 6 is a cable gland 6a through which catheter 4 passes. It comprises two parts, a male part 6b and a female part 6c, assembled according to the principle of a bolt. These two male 6b and female 6c parts trap an O-ring 6d compressed by the screwing and tightening of the female part 6c (nut) on the male part 6b (screw). The lower male part 6b has a flat base bearing on the outer side of the cover 2. The screwing of the upper female part 6c on the lower male part 6b crushes the O-ring 6d. The O-ring 6d expands in the direction of the catheter 4 and compresses the wall of the catheter 4 in a circular way. The tightening is continued until complete immobilization of the catheter 4 previously tensioned according to the desired tension. This blocking means 6 independent of the tensioning tube 1 thus makes it possible to keep the lumen 4b of the catheter 4 open. Urine flows normally in the direction of the arrow. The diagnosis of bleeding inside the bladder 10 is possible as well as its appropriate management.

According to another variant of the blocking means 6 of the device according to the disclosure, with reference to FIG. 8, said blocking means 6 consists of a circular spring clamping clip 7a. This spring clamping clip 7a made of plastic or metal material is of the type used in industry to seal a rubber hose on a hydraulic circuit. The pressure exerted simultaneously on the free ends of the spring clamping clip 7a increases the diameter of the circular part of the spring clamping clip 7a and allows the movement of the spring clamping clip 7a along the tubing 4a of the catheter 4. When the blocking position is identified, the operator releases the free ends of the spring clamping clip 7a. The tightening of the catheter 4 is instantaneous. The spring clamping clip 7a rests on the cover 2 of the tensioning tube 1. The lumen 4b of the tubing 4a of the catheter 4 remains open.

According to another variant of the blocking means 6 of the device according to the disclosure, with reference to FIG. 9, said blocking means 6 consists of a clamping clip with notched tongue 7b. Said clamping clip with notched tongue 7b is displaced along of the catheter 4 and tightened on the tubing 4a of the catheter 4 when the desired tension is reached. This clamping clip with notched tongue 7b bears on the cover 2 of the tensioning tube 1. The lumen 4b of the tubing 4a of the catheter 4 remains open without the tubing being flattened.

According to another variant of the blocking means of the device according to the disclosure, with reference to FIG. 10, said blocking means 6 consists of a coaxial sleeve with a notched outer wall 7c. Said co-axial sleeve with notched outer wall 7c is bonded to the outer wall of catheter 4. According to another embodiment of this variant, not shown in FIG. 10, the co-axial sleeve with notched outer wall 7c is obtained in one piece with the tubing 4a of the catheter 4. When the desired tension is reached, the blocking of the position of the catheter 4 is ensured by engaging in the wide radial slot 2a of the cover 2 the notch of the co-axial sleeve with notched outer wall 7c facing the wide radial slot 2a.

In order to ensure that the tension of the catheter is standard, with reference to FIG. 11, the device according to the disclosure comprises a pulling means 9 for pulling the catheter 4 which consists of a dynamometer 8 independent of the catheter 4 and of the tensioning tube 1. Said dynamometer 8 has a hook 8c positioned at the bifurcation of the tubing 4a of the catheter 4 to form the bladder inflation tubing 4e of the catheter 4 and the connection cone 4g for connecting the urine collection tubing in the urine collection bag, not shown in FIG. 11. Pulling on the handle 8d of the dynamometer 8 allows the extension of the spring 8a until the desired tension is reached according to the graduation 8f indicated by the cursor 8e of the dynamometer 8. The standard tension is that obtained with the maximum pulling, that is to say with the slider 8e against the base of the cylinder 8i of the dynamometer 8, the arrow representing the path travelled by the slider 8e.

According to a variant of the pulling means of the device according to the disclosure, with reference to FIG. 12, said pulling means 9 of the catheter 4 consists of a compression spring 8b coaxially surrounding the proximal end 4d of the urethral catheter 4. Said spring 8b is in the released position. The movable ring 8h is pulled in the direction of the fixed ring 8g in contact with the bifurcation at the proximal end 4d of the catheter 4. The spring 8b is compressed between the two rings 8g, 8h. The standard tension is systematically reproduced when the spring 8b is completely compressed with contiguous turns. The pulling force is then maximum, the arrow representing the path travelled by the movable ring 8h.

The operation of the device according to the disclosure after surgery for benign prostatic hyperplasia will now be explained with reference to FIGS. 13 to 19.

With reference to FIG. 13, urine drains from the bladder 10 through urethral canal 12 from the bladder orifice 10a. The urethra 12 comprises 4 segments, namely the prostatic urethra 12a which crosses the prostate 11, the membranous urethra 12b which crosses the perineal diaphragm 15 with the striated sphincter of the urethra, the perineal urethra 12c and finally the penile urethra 12d single movable portion of the canal. It ends at the tip of the glans by the urethral meatus 12e. From the age of fifty, the prostate 11 grows due to the development of the glands located around the canal of the prostatic urethra 12a. The increase in the volume of these glands, also called adenoma 11a of the prostate 11, compresses the prostatic portion 12a of the duct and is responsible for discomfort in the evacuation of urine. When the medical treatment no longer works, surgery is offered to the patient.

With reference to FIG. 14, the operation consists of removing the tissue which has grown around the prostatic segment 12a of the urethra 12. The tissue is cut from the prostatic duct to the periphery of the gland. The prostatic urethra 12a disappears and is replaced by a prostatic cavity 11c. Only the peripheral zone 11b of the prostate 11 remains in place; the peripheral zone 11b represents the wall of the prostatic cavity 11c. Bleeding during and after the operation originates from the opening of the bladder 10a or upper opening 11e of the prostate cavity 11c, from the entire surface inside the prostate cavity 11c and from the section of the canal at the above the perineal diaphragm 15 with the striated sphincter. This section of the channel is the lower orifice 11f of the prostatic cavity 11c. The upper orifice 11e of the cavity is also the orifice of the bladder 10a which was enlarged by the operation. Bleeding from the upper orifice of the cavity and the surface of the cavity drains into the bladder and can form blood clots.

With reference to FIG. 15, after the operation, a urethral catheter 4 or indwelling catheter or Foley catheter is systematically placed inside the bladder 10. The distal end 4h of the catheter 4 has at least an orifice 5b which allows the drainage of urine outside the bladder 10. The bladder balloon 5 located near the distal end 4h of the catheter 4 will be inflated so as to prevent the catheter 4 from sliding downwards. The bladder balloon 5 will rest on the upper orifice 11e of the prostate cavity 11c or inside the prostate cavity 11c depending on the filling volume of the balloon left to the discretion of the operator. In the context of the disclosure, it is essential that the bladder balloon 5 remains inside the bladder 10 and does not descend inside the prostatic cavity 11c. Indeed, according to the disclosure, the haemostasis of the cavity is based on the occlusion of the upper orifice 11e of the prostate cavity 11c by the inflated bladder balloon 5 and the mechanical compression of the vessels which bleed inside the cavity. It will be noted that the fine pipe which allows the filling of the bladder balloon 5 is never shown in all of the figures. It is located in the wall of the catheter 4 and extends from the filling tube 4e of the bladder balloon 5 to an orifice located inside the bladder balloon 5.

With reference to FIG. 16, the bladder balloon 5 of the urethral catheter 4 has very different standard characteristics from the balloons of the CH probes 22 to 24 usually used after operation for the adenoma 11a of the prostate 11. Its shape in the inflated state is cylindrical with a flat base, standard fill volume (invariable), at a standard pressure that gives the balloon its cylindrical shape. These characteristics described in the international patent application WO2017/174950 filed by the Applicant allow the bladder balloon 5 to remain inside the bladder and to avoid sliding down inside the prostate cavity 11c under the effect of pulling on the catheter 4. Like a cover over a saucepan, the bladder balloon 5 allows the occlusion and compression of the prostatic cavity 11c under the effect of a pulling force applied to the tubing 4a of the catheter 4 along its longitudinal axis. This standardized pulling force is obtained thanks to one of the pulling means 9 previously described with reference to FIGS. 11 and 12 and the combination of a means for tensioning and blocking under tension by the tensioning tube (1) object of the present disclosure.

With reference to FIG. 17, after inflation of the bladder balloon 5 of the catheter 4 in a standardized manner inside the bladder 10, the tensioning tube 1 is placed around the penis 14 of the patient and the catheter 4. The proximal end 1c of the tensioning tube is at a distance from the pubis 13.

Then, with reference to FIG. 18, the operator holds the tensioning tube 1 with a first hand by its distal end 1b. The operator positions the proximal end 1c of the tensioning tube 1 against the pubis 13 of the patient. With his second hand the operator pulls on the dynamometer 8 (not shown in the figure) hooked below the bifurcation of the tubing 4a of the catheter 4, until obtaining a pulling force in the range of 40 Newtons. With the thumb of the other hand, he forces the tubing 4a to be engaged and blocked under tension in the narrow radial slot 2a of the cover 2 of the tensioning tube 1. The tubing 4a of the catheter 4 is under tension over the distance who go from the base of the bladder balloon 5 which compresses the prostatic cavity 11c, up to the blocking point of the tubing 4a of the catheter 4 in the narrow radial slot 2a of the cover 2 at the distal end 1b of the tensioning tube 1. This distance is represented by the angled arrow in FIG. 18. The prostatic cavity 11c is crushed and kinked, its height reduced, its volume reduced. The bleeding is stopped, it takes place only inside the prostatic cavity 11c. The volume of the lost blood is limited to the volume of the prostatic cavity 11c. This volume is less than ten cubic centimetres. The tension is maintained for a period in the range of one hour, the time for coagulation to be established at the level of the prostatic cavity 11c. The bleeding time before the natural formation of a clot is in the range of 5 minutes after cutting the skin. The lumen 4b of the catheter 4 is compressed at the level of the radial slot 2a of the cover 2 at the distal end 1b of the tensioning tube 1. The flow of urine is stopped. Monitoring urine colour requires releasing the tension of the catheter 4 at regular time intervals so as to allow urine to flow from the bladder 10 and examine its colour. The prostatic cavity 11c is excluded from the urinary circuit. The risk of clots forming inside the bladder 10 is eliminated. Bladder irrigation is not warranted. The use of catheter 4 blocking means not integrated into the tensioning urethral tube, as previously described with reference to FIGS. 7 to 10, does not cause the lumen 4b of catheter 4 to close and allows the flow urine. The monitoring of the colour of the urine is then possible permanently.

With reference to FIG. 19, the catheter 4 slides freely through the wide radial slot 2a of the cover 2 of the tensioning tube 1. The blocking of the tension of the catheter 4 comes from the tightening of a blocking means 6 sliding along the catheter 4 and coming to bear on the cover 2 of the tensioning tube 1. The tightening does not cause the closure of the lumen 4b of the tubing 4a of the catheter 4. The bladder balloon 5, inflated first, compresses the prostatic cavity 11c. The second prostate balloon 5a positioned inside the prostate cavity 11c is then inflated in a second time by the inflation tube of the prostate balloon 4f up to a standard pressure. The second prostatic balloon 5a ensures with the bladder balloon 5, initially inflated and in tension, haemostasis by mechanical compression on either side of the wall of the prostate cavity 11c. This second prostate balloon 5a has characteristics opposite to those of the bladder balloon 5. The second prostate balloon 5a does not have a standard shape, its thin wall is intended to be molded on the crevices of the wall of the prostate cavity 11c, the filling volume depends on the volume of the compressed cavity but is done with standard pressure. In the figure the balloon is not fully inflated. Its wall is still at a distance from the wall of the prostatic cavity and the wall of the bladder balloon. Once the prostatic balloon is fully inflated, its wall is in contact with that of the bladder balloon and that of the prostatic cavity.

Faced with a tissue cut, the compression of the bleeding zone is the most effective mode of haemostasis while awaiting additional haemostasis provided by natural biological and medicinal means. Placing pulling to control bleeding after treatment of an adenoma 11a of the prostate 11 is not a new technique. Nevertheless, the device according to the disclosure allows the standardization of the concept of haemostatic pulling with the balloon of the urethral catheter 4 in the bladder 10 and the exclusion of the urinary circuit from the bleeding zone which is the prostate cavity 11c and its upper orifice 10e. This standardization is obtained thanks to a dedicated catheter 4 and to a standard pulling force by the use of a dynamometer 8 integrated or not in the catheter 4, a blocking means 6 and a tensioning means 9. The standardization of pulling allows effective and immediate haemostasis as soon as it is applied. Bladder irrigation classically started systematically as soon as the catheter is placed 4 at the end of the operation and maintained for one to several days until the spontaneous cessation of bleeding is no longer necessary.

The inflation of the second prostatic balloon 5a positioned inside the prostatic cavity 11c increases the effectiveness of haemostasis by mechanical compression ensured by the bladder balloon 5. With the tensioning tube 1 object of the disclosure, the areas of support are the upper orifice 11e of the prostate cavity 11c in contact with the bladder balloon 5 and the pubis 13 in contact with the proximal end 1c of the tensioning tube 1.

The rich vascularization of the base of the prostate 11 and of the bladder 10 is precisely one of the reasons for the abundance of bleeding at their level. This rich vascularization is a natural protection against ischemia. Moreover, the support of the bladder balloon 5 is not punctual; the pressure is distributed over the entire surface surrounding the orifice of the bladder 10a in contact with the base of the bladder balloon 5. The risk of ischemia at this level is low. The penis 14 and the glans 14a are protected from any compression, due to the diameter and the length of the tensioning tube 1 adapted to the dimensions of the penis 14 outside the erection. The penis 14 and the glans are aligned in the central axis of the tensioning tube 1 without contact with its wall 1a.

In addition, the pressure exerted on the pubis 13 is not painful, nor dangerous in terms of the cutaneous vascularization, with the catheter 4 in place in the bladder 10 and blocked under tension with a pulling force in the range of 40 Newtons. The pulling is applied at the end of the operation and for a period during which the patient is in the recovery room, still under the effect of anaesthesia, either spinal anaesthesia or general anaesthesia. The patient feels no discomfort.

According to another variant of the device according to the disclosure, with reference to FIG. 20, the radial slot 2a of the cover 2 is, in the same way as previously, narrow, i.e. has a width less than the outer diameter of the catheter 4 or at the French of the catheter 4, thus forming a blocking means 6 of the tensioning tube 1. Moreover, the opening of said radial slot 2a has a V-shape 2b ensuring the guidance of the catheter 4 during the introduction of the catheter 4 in said radial slot 2a. Thus, in this variant, the radial slot 2a is the blocking means 6 of the catheter 4, the blocking means 6 being thus integrated into the tensioning tube 1. The tensioning tube 1 plays both the role of tensioning and blocking the position and the tension of the catheter 4. Once the catheter 4 has been put under tension with the desired force, the blocking of the catheter 4 takes place by lateral pressure exerted perpendicularly to the longitudinal axis of the catheter 4. The exerted pressure makes it possible to engage the catheter 4 in the V-shaped opening 2b at the periphery of the cover 2 as far as the bottom of the radial slot 2a, that is to say at the centre of the cover 2.

This variant differs from that previously described in FIG. 3 in that the so-called narrow radial slot 2a has a circular widening 20 at the centre of the cover 2. The diameter of the circular widening 20 at the centre of the cover 2 is smaller than the diameter of the catheter 4. Thus, despite the blocking of the catheter 4 in position in the centre of the cover 2, the flow of urine is maintained inside the catheter 4.

According to another variant of the device according to the disclosure, with reference to FIG. 21, the radial slot 2a of the cover 2 is, in the same way as previously, narrow, i.e. has a width less than the outer diameter of the catheter 4 or at the French of the catheter 4, thus forming a blocking means 6 of the tensioning tube 1. Moreover, the opening of said radial slot 2a has a V-shape 2b ensuring the guidance of the catheter 4 during the introduction of the catheter 4 in said radial slot 2a. Thus, in this alternative embodiment, the radial slot 2a is the blocking means 6 of the catheter 4, the blocking means 6 being thus integrated into the tensioning tube 1. The tensioning tube 1 plays both the role of tensioning and blocking the position and the tension of the catheter 4. Once the catheter 4 has been put under tension with the desired force, the blocking of the catheter 4 takes place by lateral pressure exerted perpendicularly to the longitudinal axis of the catheter 4. The exerted pressure makes it possible to engage the catheter 4 in the V-shaped opening 2b at the periphery of the cover 2 as far as the bottom of the radial slot 2a, that is to say at the centre of the cover 2.

This variant differs from that previously described in FIG. 20 in that the so-called narrow radial slot 2a has several circular widenings 20, 21 of increasing or decreasing diameters close to the centre of the cover 2. Thus, catheters 4 of different diameters can be blocked while maintaining the flow of urine inside.

According to another variant of the blocking means for blocking the tubing of the urethral catheter 4, with reference to FIGS. 22 and 23, said blocking means consists of a clamp 30 consisting of two arms 31 articulated about an axis 32, each arm 31 comprising at a first end a ring 33 provided with a notched lug 34 and at its opposite end a jaw 35, and a part of the inner edge 36 of each of the jaws 35 comprising a semi-circular cutout 37 which forms, with the opposite semi-circular cutout, a circular orifice 38 in the closed position (FIG. 23).

Moreover, with reference to FIGS. 24 and 25, the device according to the disclosure includes a tension control means 40 which takes the form of a device attached to the proximal end 45 of the urethral catheter 4. In the FIG. 24, the control means 40 is in a non-activated situation. This control means 40 allows manual tensioning of the catheter 4. This control means 40 makes it possible to avoid the use of other tensioning means described above, such as a dynamometer or a compression spring, and reduce production costs. This control means 40 consists, for example, of the association of a co-axial sleeve 41 of a diameter slightly greater than that of the body 4a of the catheter 4 and of a circular mark 42 and secured to the body 4a of the catheter 4. The mark 42 is circular and is shown in dotted lines. This sleeve 41 has a standard length. The proximal end 41a of the sleeve 41 is attached to the proximal end 45 of the catheter body. Conversely, the remaining part of the sleeve 41 is free and without contact with the body 4a of the catheter. The mark 42 which is circular and secured to the surface of the proximal end 45 of the catheter 4 is set back from the free distal end 41b of the sleeve 41. Under the effect of pulling exerted on its proximal end 45, the catheter 4 elongates in a reproducible way. This mark 42 makes it possible to guarantee the reproducibility of the tensioning force of the catheter 4. In the absence of pulling, the mark 42 is halfway between the proximal end 41a and the free distal end 41b of the sleeve 41. Under the effect of manual pulling exerted on the proximal end 45 of the catheter 4, the catheter lengthens, and the mark 42 is displaced in the direction of the free distal end 41b of the sleeve 41. The standard tensioning force is reached, when the mark 42 which is circular and secured to the catheter 4 appears on the outside of the sleeve 41 and is aligned with the edge 41c of the distal end 41b of the sleeve 41. Other embodiments of the control mean 40 are possible, by combining a mark secured to the catheter and an element of standard length, one end of which is fixed to the proximal end 45 of the catheter 4 and the opposite end is free and parallel to the axis of the catheter 4. In FIG. 25, the control means 40 is in an activated situation. In this activated situation, the circular mark 42 secured to the catheter 4 and the edge of the free end 41c of the sleeve are aligned, the elongation of the body 4a of the catheter 4 being represented by the arrow.

Finally, it is quite obvious that the examples which have just been given are only specific illustrations which are in no way limiting as to the fields of application of the disclosure.

The invention claimed is:

1. A haemostatic device for treatment of postoperative bleeding from a prostate cavity, the haemostatic device comprising: at least one catheter including a first channel, a first balloon which is inflatable and provided on said catheter, the first balloon being in fluid connection with the first channel, being intended to be placed in a bladder against a neck of the bladder and being configured to exert a determined pressure in an inflated state on the prostatic cavity so as to seal and isolate the prostatic cavity, to reduce a volume of the prostatic cavity and to occlude vessels of a wall of the prostatic cavity, wherein the haemostatic device comprises at least one rigid tensioning tube having a height and an inner diameter allowing introduction, in humans, of a penis in a flaccid state without risk of compression of walls of the penis nor of glans, the rigid tensioning tube comprising a longitudinal slot which extends from a distal end to a proximal end of the rigid tensioning tube, the proximal end of the rigid tensioning tube being able to bear on a pubis, and the longitudinal slot having a width allowing passage inside the rigid tensioning tube of the catheter, the haemostatic device further comprising a blocking means for blocking the position of said catheter under tension and a pulling means for pulling the catheter to tension said catheter.

2. The device according to claim 1 wherein the distal end of the rigid tensioning tube is partially closed by a cover having a radial slot which extends from a centre of the cover to an outer periphery of the cover and which open onto the longitudinal slot of the rigid tensioning tube, the radial slot of the cover and the longitudinal slot of the rigid tensioning tube extending in a same axial and longitudinal plane.

3. The device according to claim 2, characterized in wherein said cover is glued or screwed to the rigid tensioning tube or is molded with the rigid tensioning tube.

4. The device according to claim 2, wherein the radial slot has a width greater than or equal to an outer diameter of the catheter, thus allowing passage without compression of said catheter.

5. The device according to claim 4, wherein said blocking means comprises a coaxial sleeve with notched outer wall, said coaxial sleeve with notched outer wall being glued to an outer wall of the catheter or obtained in one piece with said catheter, and the blocking of the position of the catheter being ensured by engaging in the radial slot of the cover the notch of the co-axial sleeve with notched outer wall facing the radial slot.

6. The device according to claim 2, wherein the radial slot has a width less than an outer diameter of the catheter thus forming a blocking means for blocking the catheter by the rigid tensioning tube.

7. The device according to claim 6, wherein said radial slot has an opening having a V-shape ensuring guidance of the catheter during introduction of the catheter in said radial slot.

8. The device according to claim 6, wherein the radial slot has a circular widening at the centre of the cover, the diameter of the circular widening at the centre of the cover being smaller than the outer diameter of the catheter.

9. The device according to claim 8, wherein the radial slot has several circular widenings of increasing or decreasing diameters near the centre of the cover.

10. The device according to claim 1, wherein the proximal end of the rigid tensioning tube is covered over a height of a few centimetres by a foam sheath secured to an external wall of the rigid tensioning tube, without covering the longitudinal slot.

11. The device according to claim 1, wherein said blocking means comprises a coaxial stuffing box cylinder.

12. The device according to claim 11, wherein the coaxial stuffing box cylinder comprises a male part and a female part, which are assembled according to the principle of a bolt, and which trap an O-ring configured to be compressed by screwing and tightening of the female part on the male part, the male part having a flat base bearing on an outer side of the cover and a screwing of the female part on the male part crushing the O-ring which expands in the direction of the catheter and compresses the wall of the catheter in a circular way.

13. The device according to claim 1, wherein said blocking means comprises a circular spring clamping clip bearing on the cover of the rigid tensioning tube.

14. The device according to claim 1, wherein said locking means comprises a clamping clip with notched tongue bearing on the cover of the rigid tensioning tube.

15. The device according to claim 1, wherein said blocking means comprises a clamp including two articulated arms about an axis, each arm comprising at a first end a ring provided with a notched lug and at its opposite end a jaw, and a part of the inner edge of each of the jaws comprising a semi-circular cutout which forms, with the opposite semi-circular cutout, a circular orifice in a closed position.

16. The device according to claim 1, wherein said pulling means for pulling the catheter comprises a dynamometer independent of the catheter and of the rigid tensioning tube.

17. The device according to claim 16, wherein said dynamometer comprises a hook positioned at a bifurcation of a tube of the catheter to form an inflation tube of a bladder balloon of the catheter and a connection cone for connecting a urine collection tubing for collecting urine in a urine collection bag, a handle allowing the extension of a spring up to reach a desired standard tension according to a graduation indicated by a cursor.

18. The device according to claim 1, wherein said pulling means for pulling the catheter comprises a compression spring coaxially surrounding a proximal end of the catheter, said spring extending between a movable ring and a fixed ring in contact with a bifurcation at the proximal end of the catheter.

19. The device according to claim 1, further including a tension control means device attached to a proximal end of the catheter.

20. The device according to claim 19, wherein said tension control means comprises the combination of a co-axial sleeve of a diameter slightly greater than that of a body of the catheter and a circular mark secured to the body of the catheter.

21. The device according to claim 1, wherein said catheter comprises a second channel and a second balloon, said second channel being fluidically connected to the second balloon, the second balloon being configured to, in an inflated state, extend into the prostatic cavity by conforming to irregularities of said prostatic cavity.

* * * * *